United States Patent [19]
Bekaert

[11] Patent Number: 5,988,730
[45] Date of Patent: Nov. 23, 1999

[54] ARRANGEMENT FOR RELEASABLE MOUNTING OF A WINDOW PANE IN A MOTOR VEHICLE

[75] Inventor: Werner Bekaert, Hoogstraten, Belgium

[73] Assignee: Volswagen AG, Wolfsburg, Germany

[21] Appl. No.: 08/914,447

[22] Filed: Aug. 19, 1997

[30] Foreign Application Priority Data

Aug. 22, 1996 [DE] Germany ............... 196 33 842

[51] Int. Cl.⁶ ............................................. B60J 1/10
[52] U.S. Cl. .................... 296/146.15; 296/96.21; 296/201; 52/208
[58] Field of Search .................. 296/146.15, 96.22, 296/96.25, 84.1, 201; 52/208, 204.591

[56] References Cited

U.S. PATENT DOCUMENTS

| | | | |
|---|---|---|---|
| 4,434,593 | 3/1984 | Horika et al. | 296/96.21 |
| 4,441,755 | 4/1984 | Endo et al. | 296/96.21 |
| 4,581,276 | 4/1986 | Kunert et al. | 428/157 |

FOREIGN PATENT DOCUMENTS

| | | |
|---|---|---|
| 0256946 | 2/1988 | European Pat. Off. . |
| 0351369 | 1/1990 | European Pat. Off. . |
| 0620134 | 10/1994 | European Pat. Off. . |
| 4307634 | 3/1994 | Germany . |
| 4301026 | 7/1994 | Germany . |

*Primary Examiner*—Joseph D. Pape
*Assistant Examiner*—Kiran Patel
*Attorney, Agent, or Firm*—Baker & Botts, L.L.P.

[57] ABSTRACT

A window pane mounting arrangement for a motor vehicle includes a molded-on edge part which has an adhesive application surface for the application of an adhesive to connect the edge part to a fastening flange in a window opening of the motor vehicle, the connection between the edge part and the fastening flange being releasable by a pushing or pulling force applied to the window pane. In order to reduce the consumption of adhesive, to shorten waiting times until the adhesive has hardened, and to prevent soiling of adjacent components, the adhesive application surface is formed on an adhesive application profile which is releasably connected to the edge part and can be released from the edge part by exerting the pushing or pulling force on the window pane.

22 Claims, 1 Drawing Sheet

ARRANGEMENT FOR RELEASABLE MOUNTING OF A WINDOW PANE IN A MOTOR VEHICLE

BACKGROUND OF THE INVENTION

This invention relates to window panes for motor vehicles having a molded-on edge part with an adhesive application surface for the application of an adhesive to connect the edge part to a mounting flange in a window opening for the motor vehicle in which the connection between the edge part and the fastening flange is releasable by exerting a pushing or pulling force on the window pane. The invention furthermore relates to a motor vehicle having at least one such window pane, to an adhesive application profile for such a window pane, and to a method of producing such a window pane.

Motor vehicle window pane mounting arrangements of the foregoing type are disclosed in German Offenlegugsschrift No. 43 01 026 and European Published Application No. 0 620 134. In those publications, an adhesive application surface is provided on the arms and the yoke of a portion of the edge part which is U-shaped or pinetree-shaped in cross section. That portion is in the form of a polymer profile in which the arms have undercuts serving as anchoring projections for a bead of adhesive introduced into the space between the arms and the yoke. The releasability of the connection between the frame-like edge part of the window pane and the fastening flange is achieved in the disclosed arrangements because the bead of adhesive and the polymer profile do not become adhesively bonded, so that, after hardening, the bead of adhesive is engaged in a positive-locking manner with the polymer profile, with the arms meshing, but is not bonded thereto. Under pressure applied to the window pane from the inside, the arms of the polymer profile bend elastically outwardly and thus separate from the hardened bead of adhesive so that the window pane can readily be removed from the window opening.

These window panes, mounted according to the so-called pop-out principle, have the advantage that they are not only easy to remove, but can also be inserted again later without reworking.

However, the conventional pop-out window panes have some disadvantages. Since the entire space between the arms of the edge part has to be filled with adhesive, the consumption of adhesive is relatively high which, on the one hand, slows down the working process and, on the other hand, reduces the availability of the adhesive application device because the replenishment of the adhesive supplied in drums is often interrupted. Moreover, the nozzle of the adhesive application unit must be inserted into the space between the arms of the U-shaped profile, which likewise slows down the working process somewhat and necessitates the use of a reduced nozzle diameter. This makes it difficult or impossible to mix the installation of panes having the said U-shaped profile and conventional panes in which a wedge-shape ramp of adhesive has to be applied directly to the glass or to a spacer. Additionally, in the case of a smaller nozzle diameter, the pressure in the adhesive application unit must be higher, which results in greater wear.

Since the adhesive is surrounded after application by the U-shaped profile, no air moisture, which is necessary for the adhesive to harden, reaches the adhesive. For this reason, in the conventional window pane fastening arrangements, hydroxyl ions or a wet curing solution have to be applied to the inner side of the U-shaped profile, as described in European Published Application No. 0 620 134, to accelerate curing and thereby avoid the necessity for providing large parking areas at the motor vehicle manufacturers' on which the otherwise finished motor vehicles would have to be parked until the adhesive hardens. Additionally, in the event of high demand, substantial losses of income will also be caused due to the delay in supplying the parked vehicles. Furthermore, since the adhesive and the edge part of the window pane must not become adhesively bonded, only very specific material pairings can be used, which are not always optimally suited with respect to other properties, such as extrusion capacity, material costs, etc.

SUMMARY OF THE INVENTION

Accordingly, it is an object of the present invention to provide an arrangement for releasably mounting a window pane in a motor vehicle which overcomes the disadvantages of the prior art.

Another object of the invention is to provide a releasable window mounting arrangement for motor vehicles which is more convenient and less expensive to install or replace.

These and other objects of the invention are attained by providing a window mounting frame with an edge part having an adhesive application surface formed on an adhesive application profile which is releasably connected to the edge part and can be released from the edge part by exerting a pushing or pulling force on the window pane. The invention is based on the concept of providing, similar to the conventional mounting arrangements, between the edge part and the fastening flange, firstly an adhesive bond for rapid and simple mounting of the window pane and secondly a releasable connection for releasing the window pane by displacing the releasable connection to the interface between the adhesive application profile and the edge part, with typical adhesive bondings provided at the interfaces of the adhesive with the edge part and the fastening flange. This means that the part of the adhesive which is releasably engaged to the edge part is replaced by the adhesive application profile, which makes it possible to reduce the amount of adhesive required, to shorten the hardening time, to increase the number of adhesive material pairings which can be used for the adhesive/edge part, and thus also to improve the cost reduction potential, to eliminate the risk of impairing the positive-locking connection by deforming the adhesive before it hardens and, last but not least, also to increase the potential of reducing the weight of the window pane by making it possible for the adhesive application profile to be produced from a material which has a lower density than that of the adhesive.

A preferred embodiment of the invention provides an adhesive application profile which is engaged in a positive-locking manner with the edge part and is anchored in or on the edge part by the positive-locking connection. The anchoring is preferably brought about by projections of the edge part and depressions in the adhesive application profile and/or projections of the adhesive application profile and depressions in the edge part which entered behind each other in a direction of movement of the window pane during release, holding the edge part and the adhesive application profile together.

In order to facilitate the release of the window pane when it is being removed, it is possible for only the edge part to be elastically deformable, as in the case of conventional window pane mounting arrangements, and to be engaged with a rigid adhesive application profile. Alternatively, however, it is also possible to use a flexible and/or elastic adhesive application profile in conjunction with a partially elastic or rigid edge part. The adhesive application profile can be supplied to the manufacturer or to the workshops as an endless profile in roll form and can be engaged with the edge part, which surrounds the window pane, after it has previously been cut off to an appropriate length. In contrast to conventional window pane mounting arrangements, the deformation takes place during the separation of the positive-locking connection, i.e. during removal of the window pane, in this case at least partially on the side of the adhesive application profile which will not be reused, while the edge part of the reusable window pane is not deformed, or is deformed to a lesser extent, and is thus less susceptible to damage.

The provision of the adhesive application profile means that, in comparison with the conventional window pane mounting arrangements, only a comparatively thin bead of adhesive needs to be applied, the position of which can thus be controlled better during application, therefore reducing the risk of soiling adjacent components. Further embodiments of the invention additionally provide in each case for the adhesive application profile to extend beyond the edge part on the side facing the fastening flange so that the adhesive application surface is spaced from the edge part, for the adhesive application surface to have a greater width than a bead of adhesive serving for bonding with the fastening flange, and for the adhesive application surface to be curved in a concave manner toward the fastening flange and/or to have raised side edges. In particular, during reinstallation of the window pane in a workshop where the adhesive is applied by hand, these arrangements permit improved control of the adhesive application, and contact between the adhesive and the edge part, which may lead to sticking, is reliably prevented.

In order to improve the adhesion between the adhesive and the adhesive application surface, the application surface preferably has an uneven, and thus larger, surface in cross section and may have longitudinal grooves which permit the adhesive application profile to be produced by extrusion.

According to a further preferred embodiment of the invention, the adhesive application profile is received in a peripheral receiving channel of the edge part having a cross-section complementary to that of the corresponding part of the adhesive application profile and projections are arranged adjacently on the two parts and extend longitudinally of the receiving channel and adhesive application profile and engage behind each another in a reciprocal manner. The receiving channel preferably has lateral boundaries which are zigzag-shaped in cross section and may converge in the direction of the fastening flange.

Alternatively, however, in contrast to conventional window pane mounting arrangements, it is also possible to provide the edge part with a peripheral web which is located opposite the fastening flange and is received in a positive-locking manner in a longitudinal channel of the adhesive application profile, the channel being open toward the edge part. In this case, too, the longitudinal channel and a part of the web which engages in the longitudinal channel preferably have complementary cross sections with one or more protruding projections and depressions extending in the longitudinal direction.

BRIEF DESCRIPTION OF THE DRAWINGS

Further objects and advantages of the invention will be apparent from the reading of the following description in conjunction with the accompanying drawings, in which.

DESCRIPTION OF PREFERRED EMBODIMENTS

Figure 1:
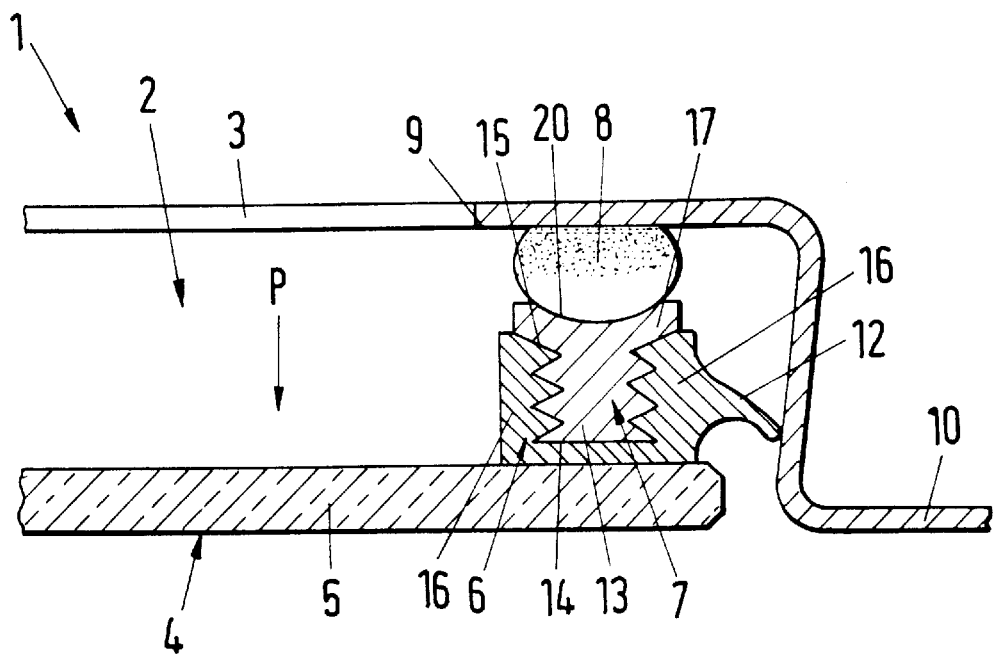
FIG. 1 is a sectional view through the edge region of a motor vehicle window showing a representative embodiment of a window pane mounting arrangement according to the invention.

The typical embodiment of a motor vehicle window 1 illustrated partially in cross section in FIG. 1 includes a mounting flange 3, which surrounds a window opening 2, and a window pane 4 which is mounted in the window opening 2 and comprises a pane 5 of glass. To mount the pane of glass 5, a plastic edge part 6 is molded onto the edge of the pane, and an adhesive application profile 7, which is releasably connected to the edge part 6, is bonded by an adhesive 8 to an outwardly facing fastening surface 9 of the fastening flange 3 when the window pane 4 is inserted into the window opening 2.

The fastening flange 3, which consists of sheet metal, has an essentially Z-shaped cross section with a holding arm 10 welded to the vehicle body in the plane of the window pane.

In the exemplary embodiment illustrated in FIG. 1, the edge part 6 consists of an extrudable thermoplastic elastomer, for example a polyolefin elastomer of isotactic polypropylene and ethylene-propylene-diene rubber which can be obtained under the brand name SANTOPRENE from the company Advanced Elastomer Systems. On its side facing away from the window opening 2, the edge part 6 is formed with a sealing lip 12 which bears against the fastening flange 3 after installation. Furthermore, the edge part 6 has a peripheral receiving channel 14 which is open toward the fastening flange 3 and in which a foot part 13 of the adhesive application profile 7 which faces the window pane 4 is received.

The receiving channel 14 of the edge part 6 and the foot part 13 of the adhesive application profile 7 have complementary cross sections. Both the two opposite inner faces of the side walls 16 of the receiving channel 14 and the opposed longitudinal side faces of the foot part 13 have a zigzag-shaped cross section with mutually corresponding triangular projections and depressions, so that the foot part 13 and the edge part 6 engage each other in a positive-locking manner with mutual meshing in order to anchor the adhesive application profile 7 releasably in the receiving channel 14. There are three projections and depressions on or in the side walls 16 of the receiving channel and the longitudinal sides of the foot part 13 as illustrated, but a higher or lower number of projections and depressions may be provided depending on their shape, their engagement depth and the material pairing.

Depending on whether the adhesive application profile 7 is mounted on the pane of glass 5 in one operation, for example by coextrusion together with the edge part 6, or is inserted into the receiving channel 14 as a cut item after it has previously been cut to length or as a rigid molding, the profile 7 may consist of an elastic, semi-elastic or rigid, thermoplastic or cross-linkable plastic material which can be extruded or produced by injection molding, provided that it has good properties of adhesion with the adhesive 8, which is generally a polyurethane adhesive.

The edge part 6 and the adhesive application profile 7 are releasably engaged at a joint 15 so that they can be released from one another by a pushing force exerted on the window pane 4 from the inside in the direction of the arrow P in FIG. 1. In this case, the two side walls 16 of the receiving channel 14 bend outwardly as a result of their elasticity, possibly with simultaneous deformation of the adhesive application profile 7 if that profile is made of an elastic or semi-elastic material.

A top part 17 of the adhesive application profile 7, which faces away from the window pane 4 and is adjacent to the fastening flange 3, has a slightly greater width than the foot part 13. This prevents the adhesive 8, applied as a bead of adhesive onto an adhesive application surface 20 located opposite the fastening flange 3, from coming into contact with the edge part 6. To enlarge the interface between the adhesive and adhesive application profile while maintaining the same width of the bead of adhesive, and to guide an outlet nozzle of an adhesive gun (not illustrated) in the event of manual adhesive application, the adhesive application surface 20 is curved slightly in a concave manner in the direction of the fastening flange 3 and has raised side edges. Additionally, the adhesive application surface 20 may be provided with small grooves (not illustrated) extending in the longitudinal direction of the profile 7.

Figure 2:
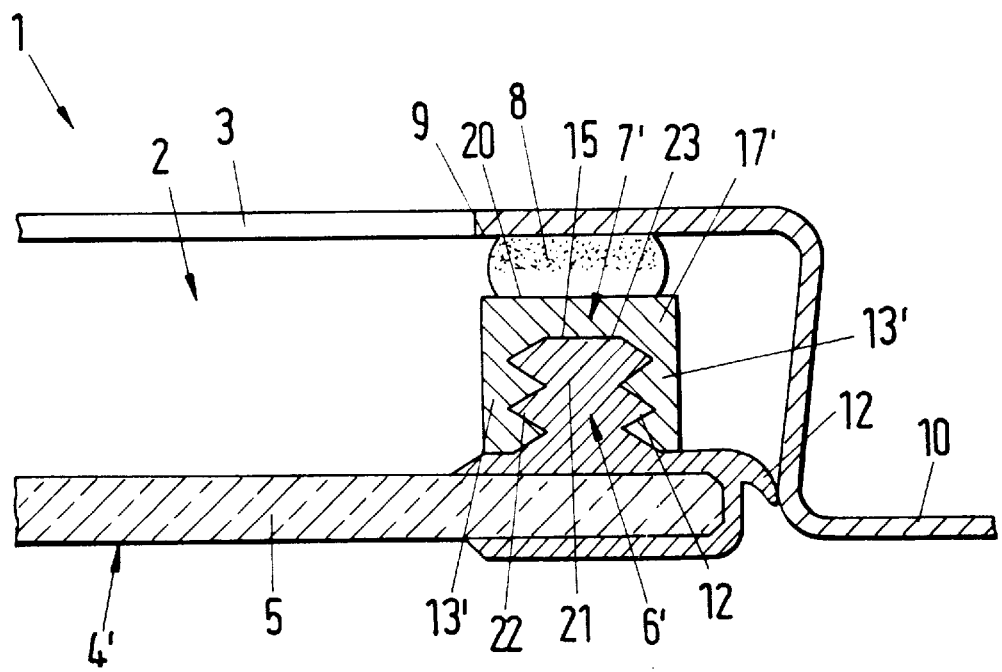
FIG. 2 is a sectional view similar to FIG. 1, showing a different representative embodiment of a window pane mounting arrangement according to the invention.

In the further embodiment illustrated in FIG. 2, a different type of edge part 6 is mounted on the edge of the pane of glass 5 and has on its inwardly facing side a web 21 which surrounds the inner broad side face of a window pane 4' and has opposed longitudinal side faces 22 which are zigzag-shaped in cross section. The web 21 is engaged in a positive-locking manner with a longitudinal channel 23 of an adhesive application profile 7'. The channel 23 is open in the direction of the window pane 4', is complementary to the web 21 and has an essentially U-shaped cross section, the yoke which has a top part 17' provided with an adhesive application surface 20 on the side facing the fastening flange 3, while its two arms forming a foot part 13' are meshed with the longitudinal side faces 22 of the web 21.

In this embodiment, the edge part 6' may be made of a comparatively inelastic thermoplastic material, while the adhesive application profile 7' is made of a preferably extrudable elastomer, so that the two arms 13' bounding the longitudinal channel 23 spread apart due to a force in the direction of the arrow P when the window pane 4' is released, as a result of which the web 21 moves out of the longitudinal channel 23. In both cases, the window pane 4 or 4' can be reused without reworking, while, for reuse of the mounting flange 3, the adhesive 8 and the adhesive application profile 7 or 7' are separated from the mounting surface 9 of the flange, any remaining residue of adhesive being just as suited as the mounting surface 9 itself as a base for a renewed application of adhesive.

To produce the window pane 4 or 4' provided with an edge part 6 or 6' and an adhesive application profile 7 or 7', the edge part 6 or 6' is molded onto the peripheral edge of the prepared and cleaned pane of glass 5 by extrusion or in an injection mold and, in the process, is firmly connected thereto. The application method used, i.e. extrusion or injection molding, is determined, inter alia, by the materials used for the edge part 6 or 6' and the adhesive application profile 7 or 7' and by the mechanical equipment present.

If the edge part 6 or 6' is extruded, the adhesive application profile 7 or 7' may be produced by coextrusion at the same time as the edge part 6 or 6', in which case use is made of plastic materials which do not stick to each other after emerging from an extrusion nozzle, even in the free-flowing state. As an alternative, the edge part 6 or 6' can first be extruded onto the edge of the pane of glass 5 and the adhesive application profile 7 or 7', in the form of a separately produced component, can subsequently be pressed into the receiving channel 14 (FIG. 1) or onto the peripheral web 21 (FIG. 2).

If the edge part 6 or 6' is to be produced by injection molding, the adhesive application profile 7 or 7' can be placed in the injection mold, and the edge part 6 or 6' can subsequently be injected, depending on the properties of elasticity desired, from an elastomer, a thermoplastic material or a cross-linking two-component mixture such as, for example, polyurethane. If desired, a release agent may be applied beforehand onto the surfaces of the adhesive application profile 7' or 7' which are in contact with the edge part 6 or 6', in order to prevent sticking to the edge part 6 or 6' during injection molding. Alternatively, the edge part 6 or 6' and the adhesive application profile 7 or 7' can be produced as two separate components which are subsequently brought into positive-locking engagement with one another.

Prior to the installation of the prepared window pane 4 or 4', the edge part 6 or 6' and the profile 7 or 7', the adhesive 8 is applied as a wedgeshaped bead of adhesive onto the adhesive application surface 20 of the adhesive application profile 7 or 7' which is located opposite the fastening surface 9. The wedge-shaped application assures a uniform cross section of the bead of adhesive, in contrast to application of the adhesive into a receiving channel of the edge part, as disclosed in the German Offenlegugsschrift No. 43 01 026, since the outlet nozzle of the adhesive gun does not come into contact with the edge part 6 or 6' or the adhesive application profile 7 or 7'. Because of the resulting absence of indentation points in the bead of adhesive, the water-tightness of the window pane 4 or 4' is additionally improved, and soiling of adjacent construction elements with the adhesive 8 is prevented.

If the window pane 4 or 4' has been removed by pushing it out of the window opening 2 as described above, reinstallation of the window can be carried out at a workshop, for example after repainting the vehicle body in the region of the window opening, by mounting a new adhesive application profile 7 or 7' with a corresponding cross section but possibly made of a different material than the original profile 7 or 7', on the edge part 6 or 6', and then inserting the window pane 4 or 4' into the window opening 2 after a bead of adhesive has been applied to the adhesive application surface 20.

If the edge part 6 consists of a suitable material and has a receiving channel 14 as illustrated, for example, in FIG. 1, it is also possible, as an alternative, for the adhesive application profile 7 to be dispensed with during reinstallation and for the adhesive 8 to be introduced directly into the receiving channel 14 as disclosed in German Offenlegugsschrift No. 43 01 026, in which case, however, an adhesive must be used which does not bond adhesively to the material of the edge part 6.

Although the invention has been described here with reference to specific embodiments, many modifications and variations therein will readily occur to those skilled in the art. Accordingly, all such variations and modifications are included within the intended scope of the invention.

I claim:

1. A window pane mounting arrangement for a motor vehicle comprising:
    a window pane;
    an edge part affixed to an edge of the window pane; and
    a fastening flange in a window opening of the motor vehicle;
    the edge part comprising:
        an adhesive application profile which is releasably connected to the edge part and can be released from the edge part by exerting a pushing or pulling force on the window pane and;

an adhesive application surface on the adhesive application profile to receive adhesive to connect the edge part to the fastening flange.

2. A window pane mounting arrangement according to claim 1 wherein the adhesive application profile is connected to the edge part by a positive-locking connection and is anchored to the edge part through the positive-locking connection.

3. A window pane mounting arrangement according to claim 1 wherein the edge part and the adhesive application profile are meshed with one another.

4. A window pane mounting arrangement according to claim 1 wherein the adhesive application profile comprises a material with which the adhesive bonds adhesively.

5. A window pane mounting arrangement according to claim 1 wherein the adhesive is a polyurethane adhesive.

6. A window pane mounting arrangement according to claim 1 wherein at least one of the edge part and the adhesive application profile is elastically deformable to permit release of the window pane from the fastening flange.

7. A window pane mounting arrangement according to claim 1 wherein the adhesive application surface of the adhesive application profile has a greater width than a bead of the adhesive for bonding it to the fastening flange.

8. A window pane mounting arrangement according to claim 1 wherein the adhesive application profile protrudes beyond the edge part on the side of the edge part which faces the fastening flange.

9. A window pane mounting arrangement according to claim 1 wherein the adhesive application surface has an uneven cross section.

10. A window pane mounting arrangement according to claim 9 wherein the adhesive application surface is curved in a concave manner toward the fastening flange.

11. A window pane mounting arrangement according to claim 9 wherein the adhesive application surface has longitudinal grooves.

12. A window pane mounting arrangement according to claim 1 wherein the adhesive application surface has raised side edges.

13. A window pane mounting arrangement according to claim 1 wherein the adhesive application profile is received in a channel of the edge part which surrounds the window opening.

14. A window pane mounting arrangement according to claim 13 wherein the receiving channel and a part of the adhesive application profile which is received in the channel have complementary cross sections.

15. A window pane mounting arrangement according to claim 13 wherein opposite side walls of the channel each have at least one projection extending in the longitudinal direction of the channel which engages behind a parallel projection of the adhesive application profile in a direction of movement of the window pane during release.

16. A window pane mounting arrangement according to claim 1 wherein the edge part has a peripheral web which faces the fastening flange and engages a longitudinal channel of the adhesive application profile.

17. A window pane mounting arrangement according to claim 16 wherein the longitudinal channel and a part of the web which engages in the longitudinal channel have complementary cross sections.

18. A window pane mounting arrangement according to claim 16 wherein opposite side walls of the longitudinal channel each have at least one projection extending in the longitudinal direction of the longitudinal channel which engages behind a parallel projection of the edge part in a direction of movement of the window pane during release.

19. A motor vehicle having a window pane mounting arrangement according to claim 1.

20. An adhesive application profile to be mounted between a fastening flange of a window opening of a motor vehicle and an edge part of a window pane provided for installation in the window opening, comprising:

a top part having an adhesive application surface on its side facing the fastening flange and having at least one foot part which can be releasably connected to the edge part by a positive-locking connection.

21. A method of producing a window pane mounting arrangement including an edge part mounted on a window pane and an adhesive application profile removably receivable in the edge part comprising the step of molding the edge part onto the edge of a window pane by coextrusion with the adhesive application profile.

22. A method of producing a window pane mounting arrangement including an edge part mounted on a window pane and an adhesive application profile removably receivable in the edge part including the steps of first molding the edge part onto the edge of a window pane and subsequently mounting the adhesive application profile on the edge part.

* * * * *